(12) United States Patent
Igawa et al.

(10) Patent No.: US 6,772,193 B1
(45) Date of Patent: Aug. 3, 2004

(54) METHOD FOR CONTINUING DATA TRANSFER TO NETWORK CACHE FROM SERVER WITHOUT TRANSFERRING SAID DATA TO USER TERMINAL IRRESPECTIVE OF USER INTERRUPTION OF THE DATA TRANSFERRING REQUEST

(75) Inventors: Masaru Igawa, Kawasaki (JP); Koichi Shibata, Kamakura (JP); Shuichi Sakamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/545,308

(22) Filed: Apr. 7, 2000

(30) Foreign Application Priority Data

Apr. 9, 1999 (JP) .......................................... 11-102169

(51) Int. Cl.[7] .............................................. G06F 15/16
(52) U.S. Cl. ...................................... 709/203; 709/219
(58) Field of Search ................................ 709/203, 216, 709/219, 223, 226, 231, 235; 711/113

(56) References Cited

U.S. PATENT DOCUMENTS

| | | | | |
|---|---|---|---|---|
| 5,584,007 A | * | 12/1996 | Ballard ........................ | 711/113 |
| 5,805,804 A | * | 9/1998 | Laursen et al. ............. | 709/223 |
| 5,857,101 A | * | 1/1999 | Ballard et al. | |
| 5,913,041 A | * | 6/1999 | Ramanathan et al. ....... | 709/235 |
| 6,014,693 A | * | 1/2000 | Ito et al. ..................... | 709/219 |
| 6,016,520 A | * | 1/2000 | Facq et al. .................. | 709/219 |
| 6,119,151 A | * | 9/2000 | Cantrell et al. ............. | 709/216 |
| 6,167,438 A | * | 12/2000 | Yates et al. ................. | 709/216 |
| 6,237,060 B1 | * | 5/2001 | Shilts et al. ................ | 709/216 |
| 6,330,606 B1 | * | 12/2001 | Logue et al. ................ | 709/226 |
| 6,336,157 B1 | * | 1/2002 | Carbonaro et al. | |
| 6,405,256 B1 | * | 6/2002 | Lin et al. .................... | 709/231 |
| 6,473,902 B1 | * | 10/2002 | Noritomi .................... | 709/203 |

FOREIGN PATENT DOCUMENTS

| | | |
|---|---|---|
| JP | 981491 | 3/1997 |
| JP | 10198623 | 7/1998 |

* cited by examiner

*Primary Examiner*—Rupal Dharia
*Assistant Examiner*—Quang Nguyen
(74) *Attorney, Agent, or Firm*—Antonelli, Terry, Stout & Kraus, LLP

(57) ABSTRACT

In a network cache and a cache control method involving the transfer of a large volume of data as the time of reproduction of multimedia data including video data, a stabilized data transfer is made by eliminating the waste of cached data or a useless cache processing which may be caused by the interruption of a user's operation. When a data transfer request from a user terminal connected to a local network is made to a server existing on the internet, a user request processing program starts a cache program. The cache program performs a cache processing independently of the data delivery to the requesting user terminal by the user request processing program so that even if the user's request is interrupted, the storage of transferred data into a cache file is performed without ceasing. Also, a required bit rate for data made an object of transfer is analyzed for comparison with a network throughput between the server and the network cache. When the network throughput is larger, the caching of transferred data is not performed so that the discard of data having been cached is not caused. Thereby, it is possible to prevent the cache hit rate from being lowered.

25 Claims, 9 Drawing Sheets

| CACHE FILE NAME | LOCATION OF VIDEO ||
|---|---|---|
| | ADDRESS OF WEB SERVER | LOCATION IN WEB SERVER |
| aa1 | 133.....001 | dir1.dir2.dir3 |
| aa2 | 133.....002 | dir4.dir5.dir6 |
| aa3 | 133.....003 | dir7.dir8.dir9 |
| ⋮ | ⋮ | ⋮ |

| WEB SERVER IP ADDRESS | ALLOWABLE THROUGHPUT |
|---|---|
| 133.....001 | 200kbps |
| 133.....002 | 300kbps |
| 133.....003 | 400kbps |
| ⋮ | ⋮ |

24 — (table)
240 — (column 1), 242 — (column 2)

FIG.11

| ADDRESS OF WEB SERVER | LOCATION IN WEB SERVER | ATTRIBUTE |
|---|---|---|
| 133.....001 | dir1.dir2.dir3 | STILL PICTURE |
| 133.....002 | dir4.dir5.dir6 | VIDEO, BIT RATE 100kbps |
| 133.....003 | dir7.dir8.dir9 | CHARACTER |
| ⋮ | ⋮ | ⋮ |

28 — (table)
280, 282, 284

METHOD FOR CONTINUING DATA TRANSFER TO NETWORK CACHE FROM SERVER WITHOUT TRANSFERRING SAID DATA TO USER TERMINAL IRRESPECTIVE OF USER INTERRUPTION OF THE DATA TRANSFERRING REQUEST

BACKGROUND OF THE INVENTION

The present invention relates to a caching technique on a network, and more particularly to a method and system for controlling the caching of user's required data between a user terminal and a server having the user's required data stored therein.

The internet is a computer network which is formed by the interconnection of networks in all the world. Numerous servers are connected to the internet. A user terminal capable of connection with the internet can make an access to one of the servers to retrieve desired information.

It does not necessarily follow that an individual network forming the internet has a sufficient throughput to flow a large amount of information. If a large amount of information is to be transferred from a WEB server to a user terminal through a network having an insufficient throughput, a long time is taken for transfer. A typical example of the conventional method for improving the throughput includes a method in which a cache is located between servers and user terminals so that transferred data is utilized plural times. This example has been disclosed by JP-A-9-81491 and JP-A-10-198623.

The cache in the above-mentioned prior art is arranged in a network system so that when a user terminal requests a server for information, the required information is sure to pass through the network cache. The information sent from the server to the user terminal is temporarily stored in the network cache. Therefore, when a user terminal makes a request for the same information again, this information is delivered by not the server which has originally held this information but the network cache which has the same information stored therein. Thereby, it becomes possible to improve the responsibility when a user terminal requests a server for information.

SUMMARY OF THE INVENTION

The above-mentioned conventional network cache has a problem that in the case where streaming is made so that a user terminal starts the reproduction of video or video data before the whole of video data on the server is received, cached data becomes incomplete at the time of interruption of display of video data at the user terminal. Namely, at a point of time when the video data reproduction is stopped at the user terminal, the video data transfer request is also stopped and hence the network cache ceases the caching of transferred data. When a request for the same data is made from a user terminal again, the incompletion of the cached data causes the server to deliver the remaining data subsequently to the delivery of the cached data from the network cache. In this case, a change in throughput of the network may be caused, thereby making it impossible to attain the stabilized delivery of video data.

An object of the present invention is to provide a network cache in which irrespective of the interruption of a transfer request from a user terminal, the caching of data required by the user terminal is made without ceasing or up to the last extremity of that data in its access unit, thereby performing the stabilized reproduction of video data at the time of re-request of the same data, a control method for controlling such a network cache and a computer program product for embodying such a control method.

In many cases, video data has a remarkably large data size as compared with character data or still picture data. Therefore, the conventional network cache has a problem that the caching of video data causes the discard of previously cached data or the reduction of a cache area for storage of data other than video data, thereby deteriorating the cache hit rate to deteriorate the network responsibility.

Another object the present invention is to provide a network cache in which in the case where it is known that the caching of transferred data is not necessary, a cache processing is eliminated, thereby preventing the cache hit rate from being deteriorated, a control method for controlling such a network cache and a computer program product for embodying such a control method.

A network cache according to one aspect of the present invention includes a user request processing unit for making the proxy delivery or transfer of required data from a server to a user terminal, and a cache control unit for performing a processing for storage of required data transferred from the server. The user request processing unit starts its processing in response to a request from the user terminal. When the user terminal stops the request, the operation of the user request processing unit is stopped. The cache control unit is activated by the user request processing unit. The user request processing unit and the cache control unit operate in parallel to each other. Thereby, even if the user terminal interrupts the request on the way, the cache control unit continues the cache processing for storage of required data up to the last extremity of that data in its access unit, for example, the end of a file.

A network cache according to another aspect of the present invention includes means for holding that highest speed or maximum network throughput for each of plural servers at which data can be flown between that server and a network cache, and means for analyzing a reproduction bit rate required for making the real-time reproduction of video data transferred or obtained from the server. The held network throughput and the required video data reproduction bit rate are compared. In the case where the ratio of the network throughput to the video data reproduction bit rate is larger than a fixed value, the caching of transferred data is not performed. Thereby, it is possible to prevent the cache hit rate from being deteriorated.

A network cache according to a further aspect of the present invention includes analyzing means such as a program module with which when data requested from a user terminal to a server is multimedia configuration information indicating a way of combining different kinds of data including character data, still picture data, video data and so forth, the multimedia configuration information is analyzed to extract picture data, thereby obtaining a required transfer rate for data made an object of transfer. Thereby, it is possible to judge whether or not the caching of transferred data should be performed in accordance with the obtained transfer rate.

Other objects, features and advantages of the present invention will become apparent from the following description of the embodiments of the invention taken in conjunction with the accompanying drawings.

BRIEF DESCRIPTION OF THE DRAWINGS

FIG. 8 is a diagram showing an example of a throughput table;

FIG. 11 is a table showing the contents of multimedia configuration information;

DETAILED DESCRIPTION OF THE EMBODIMENTS

Figure 1:
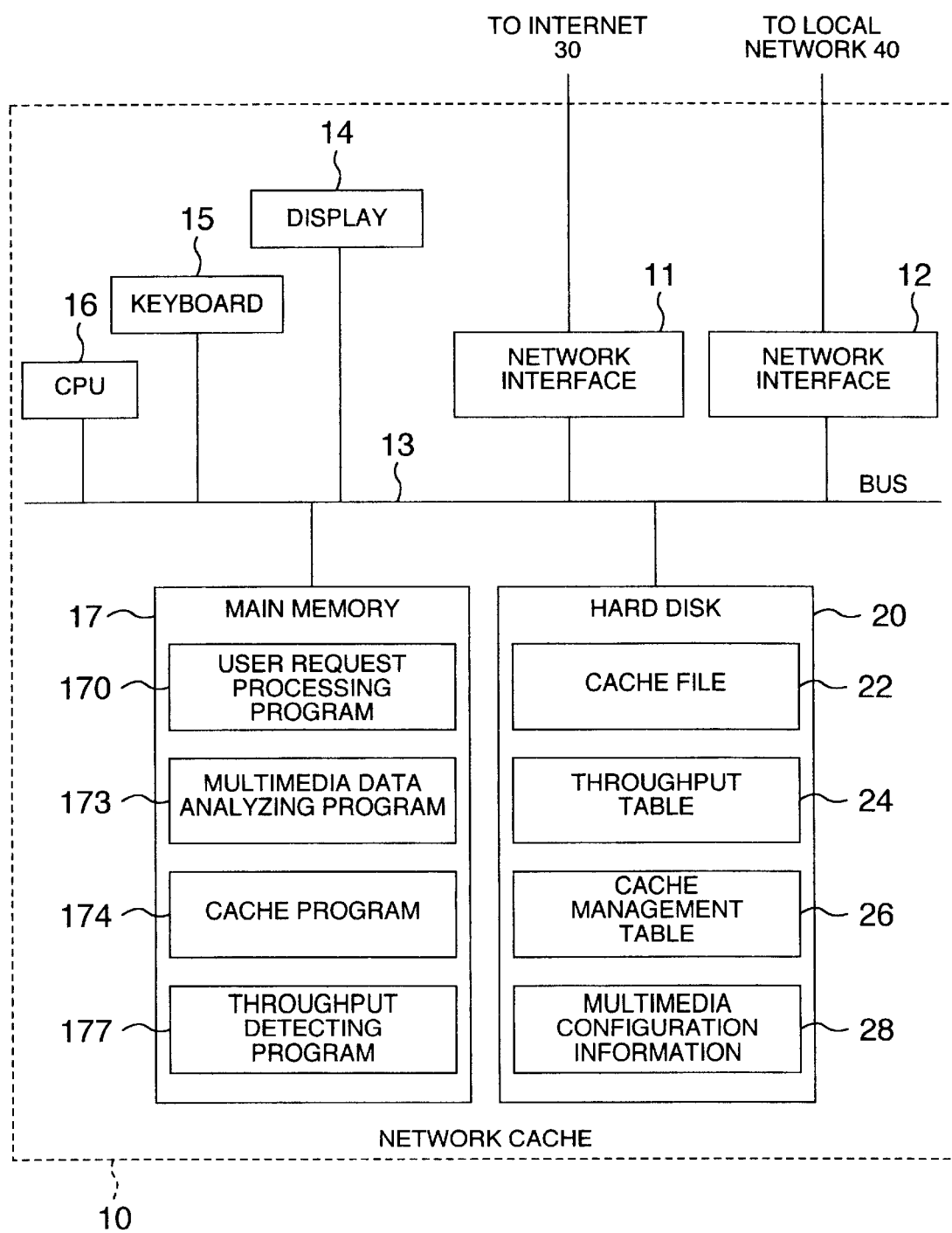
FIG. 1 is a diagram showing the hardware configuration of a network cache according to the present invention.

FIG. 1 diagram matically shows the construction of a network environment to which a network cache 10 can be applied. The network cache 10 is provided with a hard disk 20 for storage of transferred data. The network cache 10 is connected to the internet 30 and a local network 40. A plurality of user terminals 50, 51, - - - are connected to the local network 30.

When a user terminal 50 requests a WEB server in the internet 30 for multimedia data, a request message is sure to pass through the network cache 10. Namely, the network cache 10 serves as a proxy server for relaying an access to an internet service. Such a proxy server may also be called a gateway or a cache server. The network cache 10 stands proxy for the user terminal to send the multimedia data request message to the WEB server in the internet. Multimedia data transmitted from the WEB server is once received by the network cache 10. The network cache 10 transmits the multimedia data to the user terminal 50 while storing the multimedia data into the hard disk 20. The stored multimedia data serves as a cache. When a user terminal 51 then requests the WEB server for the same multimedia data, the network cache 10 transmits the multimedia data in the hard disk 20 to the user terminal 51.

Thus, since data which may frequently be accessed is available from the network cache 10 located nearer to the user terminals than the WEB server, it becomes possible for a user to obtain multimedia data of the WEB server at a fast response.

However, when the network cache 10 has the conventional construction, the network cache 10 has the following problem when multimedia data sent from a WEB server to a user terminal 50 is video data. There is the case where the user terminal 50 enjoys the delivery service of video data from the WEB server and reproduces the video data at the same time. Provided in such a case that the user terminal 50 stops the reading of video data at an intermediate point of that video data or before the last extremity of that data in its access unit, only a portion of the video data up to the intermediate point thereof is saved by the network cache 10. When a user terminal 51 then makes a request for the same video data, it is only the portion of the video data up to the intermediate point thereof which exists in the network cache. Accordingly, there arises a problem that the user terminal 51 can obtain the portion of the video data up to the intermediate point thereof at a fast response but has to obtain the subsequent or remaining portion of that video data through the internet. However, the network cache of the present invention solves the above problem.

Figure 2:
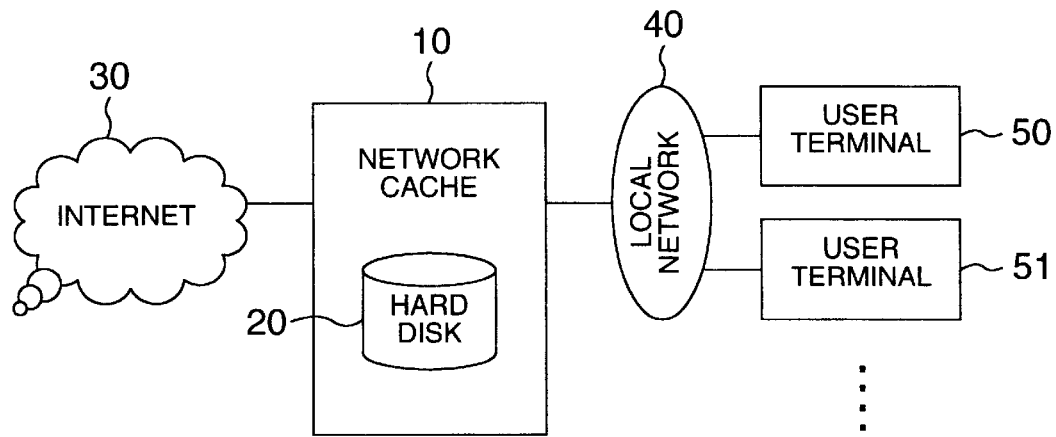
FIG. 2 is a diagram showing an example of a network construction to which the network cache according to the present invention can be applied.

FIG. 1 shows the hardware configuration of the network cache 10 according to the present invention Like the conventional network cache 10, the network cache 10 of the present invention can be used with the network construction shown in FIG. 2. The network cache 10 of the present invention includes a keyboard 15, a display 14, a CPU 16, a network interface 11, a network interface 12, a bus 13, a main memory 17 and a hard disk 20. The CPU 16 executes each program in the main memory 17 through the bus 13. The program in the main memory 17 makes an access to various files or tables in the hard disk 20 through the bus 13. The main memory 17 includes a user request processing program 170, a multimedia data analyzing program 173, a cache program 174 and a throughput detecting program 177. The hard disk 20 includes a cache file 22, a throughput table 24, a cache management table 26 and multimedia configuration information 28. The program modules and data modules stored in the main memory 17 and the hard disk 20 can be loaded from an external supplier. Alternatively, a recording medium such as a disk or semiconductor memory having those modules stored therein may be used to load the modules to the main memory 17 and the hard disk 20. The present invention intends to include these embodiments and aspects.

Figure 3:
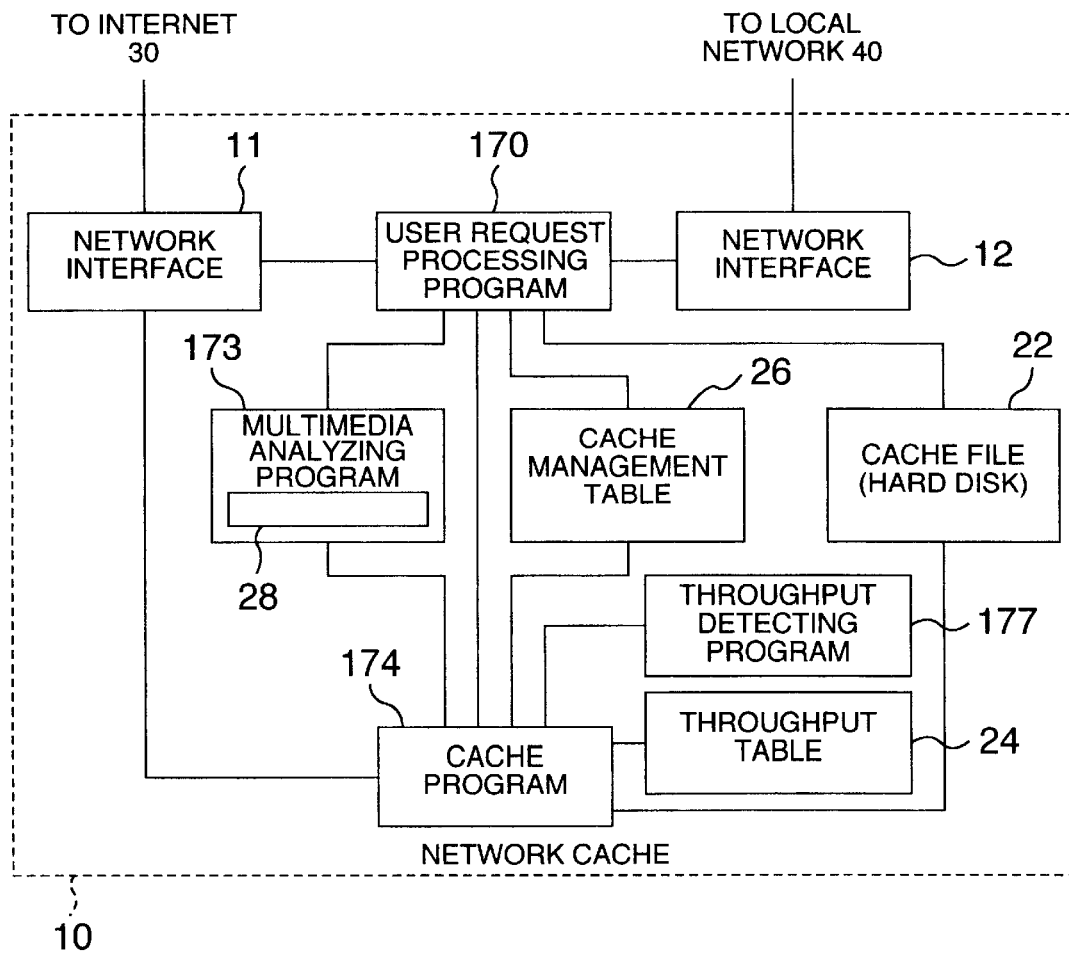
FIG. 3 is a diagram showing functional blocks of the network cache according to the present invention.

FIG. 3 shows functional blocks of the network cache 10 of the present invention. The network cache 10 will be described using FIG. 3. The network cache 10 includes functional blocks of the user request processing program 170, the cache program 174, the multimedia data analyzing program 173, the throughput detecting program 177, the cache file 22, the throughput table 24, the cache management table 26, the network interface 11 and the network interface 12. The network cache 10 serves a proxy server.

A WEB server access request or multimedia data acquisition request sent from a user terminal 50 through the local network 40 reaches the user request processing program 170 through the network interface 12. The user request processing program 170 sends the multimedia data acquisition request to a WEB server in the internet 30 through the network interface 11. Then, the WEB server transmits multimedia data. The transmitted multimedia data reaches the user request processing program 170 through the network interface 11. The user request processing program 170 sends the multimedia data to the user terminal 50 through the network interface 12. The operation to this point is the same as that of an ordinary proxy server.

When the WEB access request is received from the user terminal 50 through the local network 40, the user request processing program 170 starts the cache program 174. Independently of the user request processing program 170, the cache program 174 makes an access to the WEB server in the internet 30 through the network interface 11 to acquire a bunch of multimedia data. Also, the cache program 174 stores the acquired multimedia data as a cache file 22 while registering management information of that cache file into the cache management table 26. When the multimedia data is video data, too, a similar operation is performed. Even if the user terminal 50 interrupts the acquisition of video data, the whole of that data up to the end of in its access unit is stored as a cache file 22.

When another user terminal 51 makes a request for the same video data, the user request processing program 170 searches the cache management table 26 or inquires the cache management table 26 of whether or not the required video data has already been registered. In this instance, the data has already been registered. Therefore, the user request processing program 170 is enabled to retrieve the video data from the cache file 22 so that the whole of the video data up to the last extremity is delivered to the user terminal 51.

Figure 4:
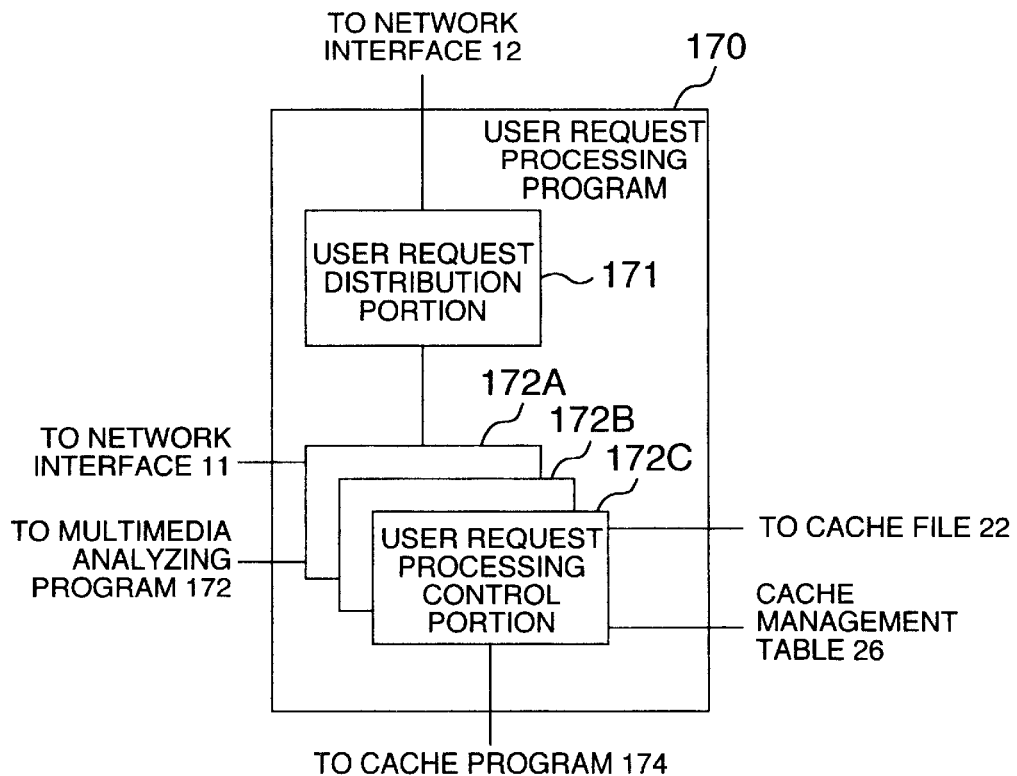
FIG. 4 is a functional block diagram of a user request processing program.

FIG. 4 shows functional blocks of the user request processing program 170. The user request processing program 170 includes a user request distribution portion 171 and a plurality of user request processing control portions 172A, 172B, 172C, - - - . Each user request processing control portion is connected to the network interface 11, the cache program 174, the cache file 22 and the cache management table 26 in the network cache 10. There is a possibility that a plurality of WEB access requests come from user terminals at the same time. The user request distribution portion 171 distributes those requests by the users so that they are assigned to the plurality of user request processing control portions 172A, 172B, 172C - - - , respectively. Each user request processing control portion intermediates between the user terminal and the WEB server. With the above construction, it becomes possible to process WEB access requests from a plurality of user terminals in parallel to each other.

Figure 5:
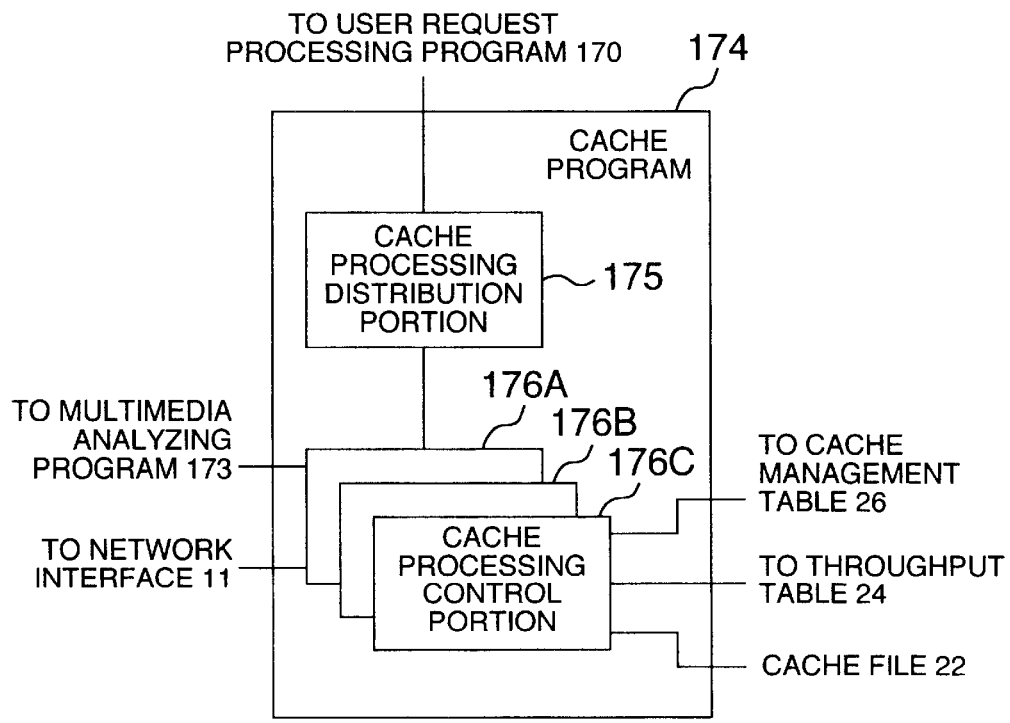
FIG. 5 is a functional block diagram of a cache program.

FIG. 5 shows functional blocks of the cache program 174. The cache program 174 includes a cache processing distribution portion 175 and a plurality of cache processing control portions 176A, 176B, 176C, - - - . Each cache processing control portion is connected to the network interface 11, the multimedia analyzing program 173, the cache file 22, the cache management table 26 and the throughput table 24. When instructions for activation of a cache processing come from the user request processing program 170, the cache processing distribution portion 175 distributes those instructions by the users so that they are assigned to the cache processing control portions 176A, 176B, 176C, - - - , respectively. Each cache processing control portion acquires WEB data through the network interface 11 in accordance with the instruction from the user request processing program 170 and performs the storage thereof into the cache file 22 and the generation/updating of the cache management table 26. With the above construction, it becomes possible to cope with WEB access processing requests from a plurality of users so that a cache read processing by the user request processing program 170 and a cache write processing by the cache program 174 are performed in parallel. The existence of the cache program 174 as a program independent of the user request processing program 170 makes it possible to perform a cache processing for video data up to the last extremity thereof even if a user interrupts an access to that video data.

Figures 6, 7:
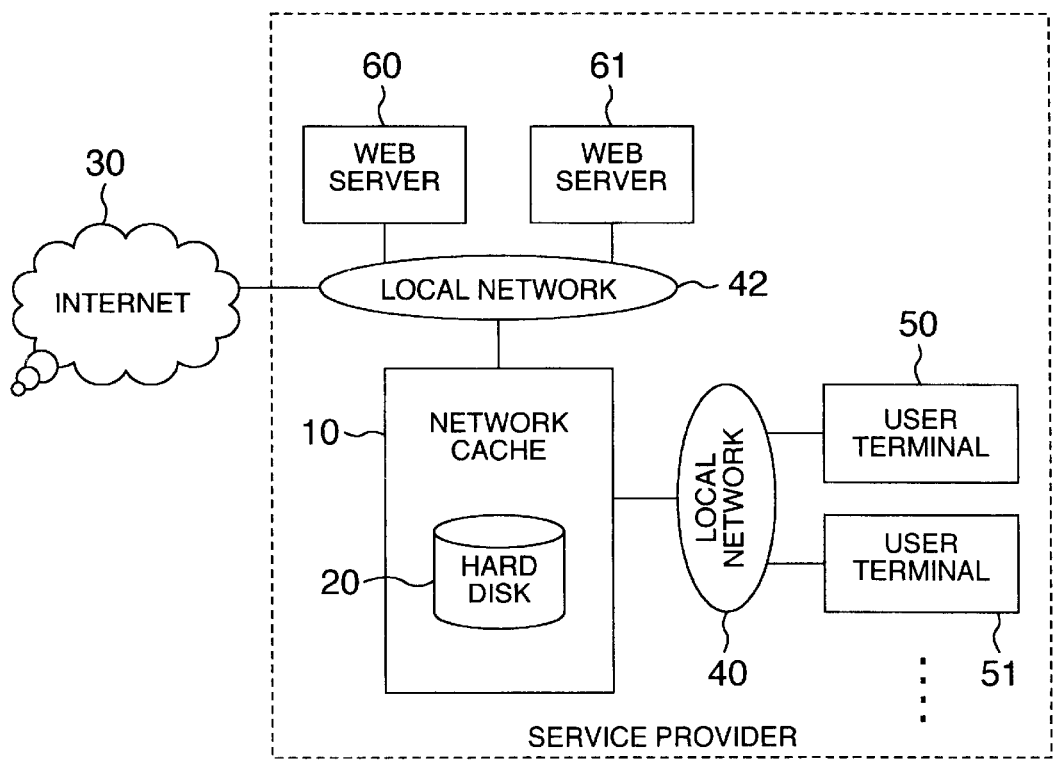
FIG. 6 is a diagram showing an example of a cache management table.
FIG. 7 is a diagram showing another example of a network construction to which the network cache according to the present invention can be applied.

FIG. 6 shows an example of the cache management table 26. In the cache management table 26, the file name of a cache file held by the network cache 10 and the storage location of cached video data on a WEB server are stored in association with each other. The cache file name is stored in a column 260, the address of a WEB server having the video data held therein is stored in a column 262 and the location in the WEB server is stored in a column 264 in the form a directory of a file system. The cache program 174 updates the cache management table 26 when a cache file is newly generated. Also, the user request processing program 170 searches the cache management table 26 in order to examine whether or not video data requested to a WEB server by a user terminal has already been held as a cache file.

FIG. 7 shows another network construction to which the network cache 10 of the present invention can be applied. This network construction is different from the network construction of FIG. 2 in that a local network 42 exists between the network cache 10 and the internet 30. An example of such a construction corresponds to the case where a service provider renders an Internet connection service to users. The local networks 40 and 42 and the network cache 10 are managed by the service provider. The local network 42 is connected with an ordinary WEB server 60 as well as a WEB server 61 which has video data held therein.

However, in the case where the network cache 10 is of the conventional type, the conventional network cache 10 has the following problem. A throughput possessed by the local network 42 is high enough to flow video data. Therefore, a stabilized reproduction of video data is possible even without the network cache 10. In other words, the caching of picture data by the network cache 10 does not function effectively. In addition, the caching of a large volume of picture data into the network cache 10 causes the large consumption of the hard disk 20 so that the other data or the previous data is discarded. Thereby, the responsibility of another user terminal is deteriorated.

A method for reducing the consumption of the hard disk of the network cache according to the present invention will now be described using the functional block diagram shown in FIG. 3. In a manner similar to that in the embodiment described in the foregoing, a user request processing program 170 starts a cache program 174 after the user request processing program 170 receives a WEB server access request from a user terminal 50. A throughput table 24 is stored with that allowable value for each WEB server having video data held therein which corresponds to the throughput value of the network between that WEB server and the network cache 10. A bit rate for reproduction of video data is included in the video data and can therefore be known through the analysis of the internal data. For example, a video encoding system called MPEG1 is prescribed by the International Standardization Organization (ISO) and it is possible to know the bit rate of video data by analyzing the contents of video data. MPEG1 is defined by ISO/IEC 11172-1. When the network throughput is larger than the video data reproduction bit rate, the user terminal 50 can receive and reproduce video data in real time even without using the network cache 10. The cache program 174 analyzes video data so that it starts the caching only when the reproduction bit rate is larger than the allowable throughput value indicated in the throughput table 24 and does not perform the caching in the case where the reproduction bit rate is not larger than the allowable throughput value. With this processing, the network cache 10 determines not to perform the caching of video data which has no need to be cached. Thus, it is possible to reduce the consumption of the hard disk, thereby preventing the network responsibility from being lowered.

FIG. 8 shows an example of the throughput table 24. In the throughput table 24, the address of each WEB server and the value of a throughput between that WEB server and the network cache 10 are stored in association with each other. A column 240 is stored with the WEB server address and a column 242 is stored with the throughput value in accordance with which the judgement is made of whether or not the caching should be performed. The values in the throughput table 24 are set by a manager of the network cache 10 beforehand on the basis of information collected with respect to WEB servers to which an access from the network cache 10 is frequent. However, the throughput may change depending on the degree of convergence or traffic of the network. When it is known beforehand that the traffic of the network changes in accordance with a time zone, the more accurate judgement of whether or not the caching should be performed is possible by updating the throughput table 24 automatically on the basis of throughput data for each time zone collected by a throughput detecting program 177. Further, the throughput table 24 may be updated dynamically by the throughput detecting program 177. The allowable throughput 242 may be set with the optimum value determined from the network load rate of the local network 42.

Figure 9:
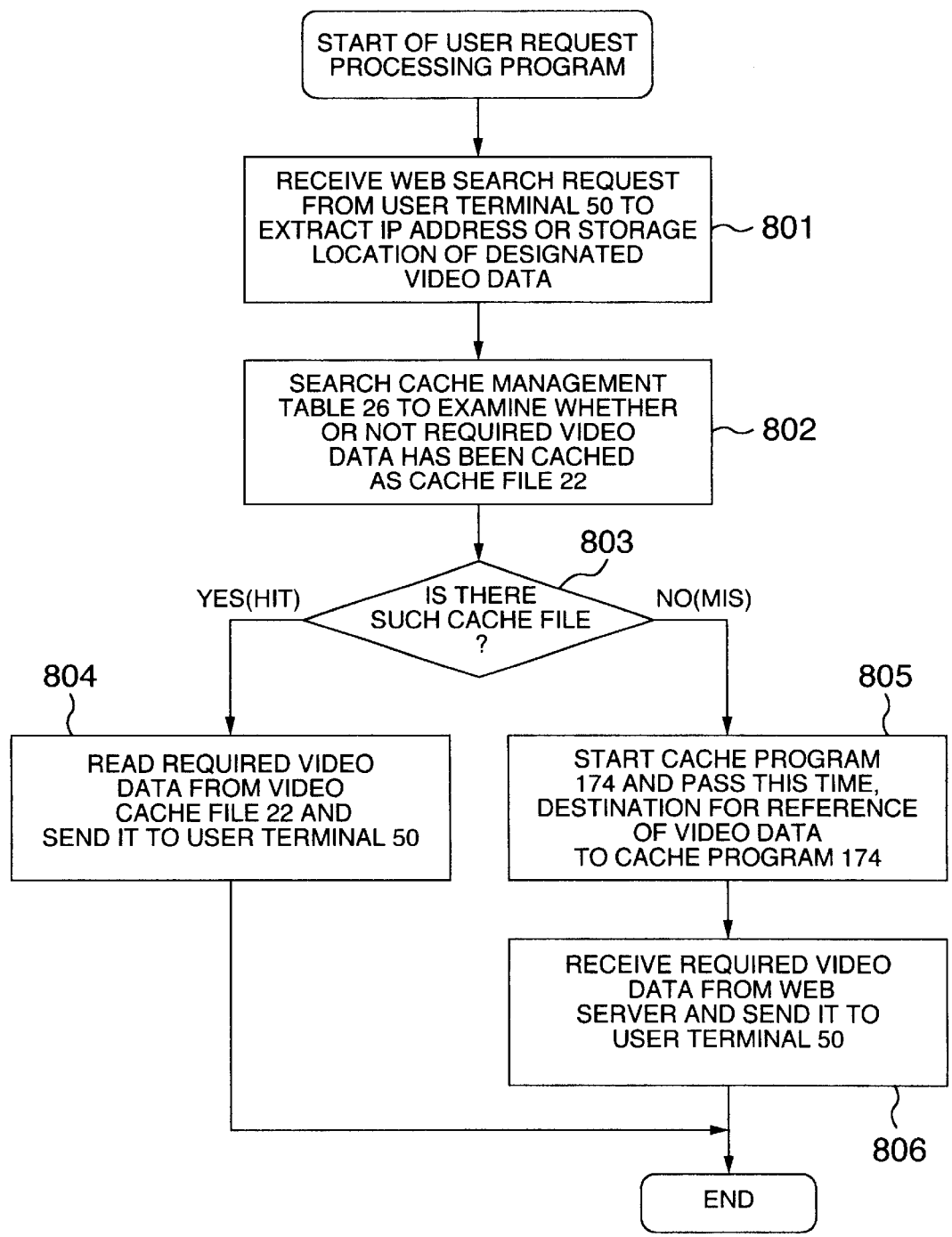
FIG. 9 is a flow chart showing the flow of a processing performed by the user request processing program.

FIG. 9 shows a flow chart of a processing performed by the user request processing program 170 when a video data access request from the user terminal 50 is processed. First, the user request processing program receives a WEB search request from a user terminal 50 (step 801) and further obtains information of a video data storage location (that is, the address of a WEB server having video data held therein and a location in the WEB server) from the search request. Next, the user request processing program 170 searches a cache management table 26 to examine whether or not the required video data has already been cached as a cache file 22 (step 802). The subsequent processing differs depending on whether or not there is such a cache file (step 803). When there is such a cache file, the user request processing program 170 reads the video data required by the user terminal 50 from the video cache file 22 and sends it to the user terminal 50 (step 804). On the other hand, when there is not such a cache file, the user request processing program 170 starts a cache program 174 (step 805). At this time, the video data storage location information (that is, the information of the address of the video data holding WEB server and the location in the WEB server) is passed from the user request processing program 170 to the cache program 174. Hereupon, the cache program 174 is activated and operates independently of the user request processing program 170. Next, the user request processing program 170 receives the video data required by the user terminal 50 from the WEB server and sends it to the user terminal 50 (step 806).

Figure 10:
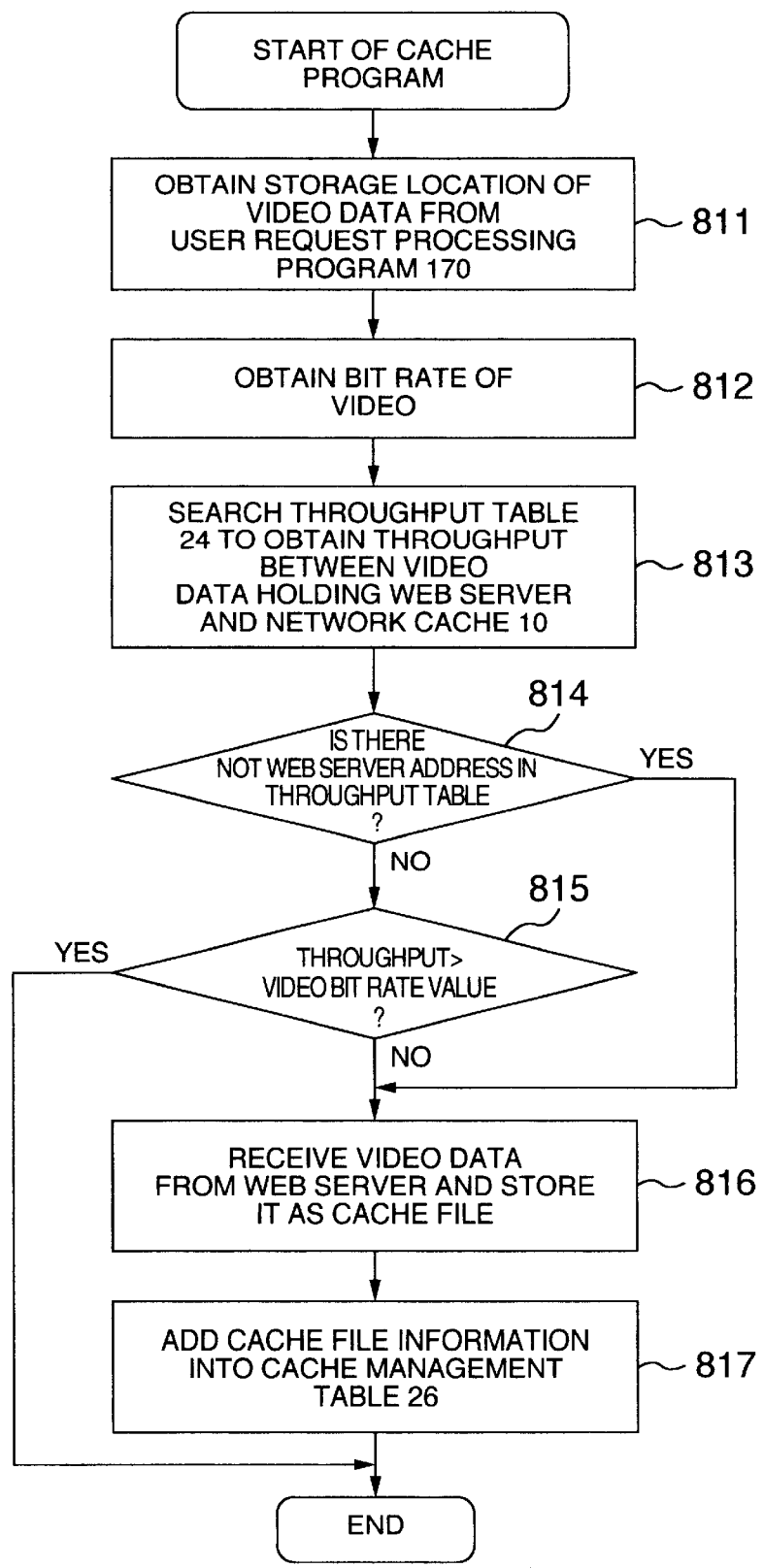
FIG. 10 is a flow chart showing the flow of a processing performed by the cache program.

FIG. 10 shows a flow chart of a processing performed by the cache program 174 when video data is cached using a throughput table 24. The cache program 174 receives an activation request from the user request processing program 170. At this time, information of a video data storage location (that is, the address of a WEB server holding video data to be cached and a location in the WEB server) is received (step 811). Next, the cache program 174 reads only the beginning part of Video data from the WEB server to analyze it, thereby obtaining a reproduction bit rate of video data (step 812). Next, the throughput table 24 is searched for a throughput value between the video data holding WEB server and the network cache 10 (step 813). When there is not the address of the corresponding WEB server in the throughput table 24 (step 814), the flow immediately jumps to step 816 in which video data is received from the WEB server. When there is the corresponding WEB server address, the comparison is made between the allowable throughput in the throughput table 24 and the video data reproduction bit rate obtained in step 812 (step 815). When the throughput value is larger, the cache processing is immediately finished. When the video data reproduction bit rate value is larger, the flow goes to step 816. In step 816, the video data is received from the WEB server and is stored as a cache file 22. Then, information of the new cache file is added into the cache management table 26 (step 817).

In the above embodiment, the description has been made of the cache control at the time of transfer of video data. However, a similar control may also be made with respect to audio data. Namely, the cache program 174 analyzes the type of data transferred from the server. In the case where audio data is to be transferred, the cache program continues the transfer from the server even when a transfer request from the user terminal 50 is interrupted. Thereby, a processing for the caching of audio data is performed up to the end of that whole data. Also, an audio data reproduction bit rate and a throughput between the server and the network cache are compared to control the cache processing.

When a large volume of data file or program file is to be transferred, a control similar to that in the foregoing embodiment can be made by comparing the required bit rate with a network throughput between the user terminal 50 and the network cache 10.

Next, a further embodiment will be described. A network construction in the present embodiment is the same as that shown in FIG. 7. The present embodiment is different from the foregoing embodiment in that data required by the user terminal 50 is not mere video data but multimedia configuration information having complex contents. The multimedia configuration information is information indicating a way of combining different kinds of data including video data, still picture data, character data and so forth and may include the FLEXMUX format of MPEG4, SMIL and so forth. MPEG4 is prescribed by ISO (see ISO/IEC 14496-1). SMIL is prescribed byt W3C (World Wide Web Consortium) (see Synchronized Multimedia Integration Language 1.0 Specification, W3C Recommendation). The multimedia configuration information holds the types and contents of individual data forming a bunch of multimedia data and a way of temporal or spatial arrangement thereof. For the convenience of illustration, only portions relevant to the present invention extracted from various information are shown in FIG. 11. It is shown that multimedia configuration information 28 includes the address of a WEB server having individual data stored therein, a location in the WEB server and the attribute of the individual data. The WEB server address, the location in the WEB server and the attribute of data are stored in columns 280, 282 and 284, respectively. The attribute of data includes the type of data (video, still picture or character) and attribute information specific to the type of data. For example, in the case of video data, the specific attribute information includes a video data reproduction bit rate.

An advantage of the use of such configuration information is that multimedia data can be arranged on different WEB servers efficiently in the aspect of file consumption by each WEB server. Namely, data which a user can look and listen (or browse) as a bunch of multimedia data is enabled to be arranged on different WEB servers for respective different kinds of data including still picture data, video data, character data and so forth. For example, provided that certain multimedia configuration information A has a video B and a still picture C as elements and another multimedia configuration information D also has the video B as an element, the video B can be designated as the same data on the same WEB server without a need to store the video B doubly. Though it is general that video data has a large data size and requires a large consumption of a hard disk, the communization of video data enables the saving of a hard disk of a WEB server. The provision of a dedicated WEB server for video data results in that when multimedia data required by a user terminal is to be delivered, all of video data are delivered from the dedicated WEB server for video data. With a construction in which a machine having an excellent delivery performance is used as a WEB server for holding video data, there is enabled an access which is agreeable when seen from a user terminal.

Next, the description using FIG. 3 again will be made of the operation of the network cache 10 of the present invention when a user terminal 50 makes an access to multimedia configuration information. The operation until the activation of a cache program 174 by a user request processing program 170 after the reception of a WEB server access request from the user terminal 50 by the user request processing program 170 is the same as that in the embodiment described in the foregoing. However, since the user terminal 50 makes the access to not mere video data but multimedia configuration information, the cache program 174 receives the multimedia configuration information from the user request processing program 170. Hereupon, the cache program 174 starts a multimedia analyzing program 173 to extract information concerning video data from the multimedia configuration information. The information concerning video data contained in the multimedia configuration information includes the address of a WEB server having the video data actually stored therein, a location in the WEB server and the bit rate value of the video data.

The subsequent processing is similar to that in the embodiment described in the foregoing. Namely, the cache program 174 inquires of a cache management table 26 about whether or not the video data has already been held as a cache file. If the video data has not yet been held, the cache program 174 searches a throughput table 24 to obtain a throughput between the WEB server having the video data stored therein and the network cache 10. When the bit rate value of the video data is larger than the throughput so that the caching of the video data is significant, the whole of video data is read from the WEB server and registered as a cache file. With the above operation, the video data specified by the multimedia configuration information can wholly be held as a cache file irrespective of whether or not the user terminal 50 reproduces the video data from its beginning extremity to its last extremity. In the case where data accessed by the user terminal 50 is not mere video data but multimedia configuration information, too, the caching is selectively made with the throughput taken into consideration, thereby making it possible to prevent the cache hit rate from being deteriorated.

When the data accessed by the user terminal 50 is not mere video data but multimedia configuration information, too, the contents of the cache management table 26 and the throughput table 24 are the same as those shown in FIG. 6 and 8, respectively. Also, the functional blocks of the user request processing program 170 and the cache program 174 are similar to those shown in FIGS. 4 and 5, respectively.

Figure 12:
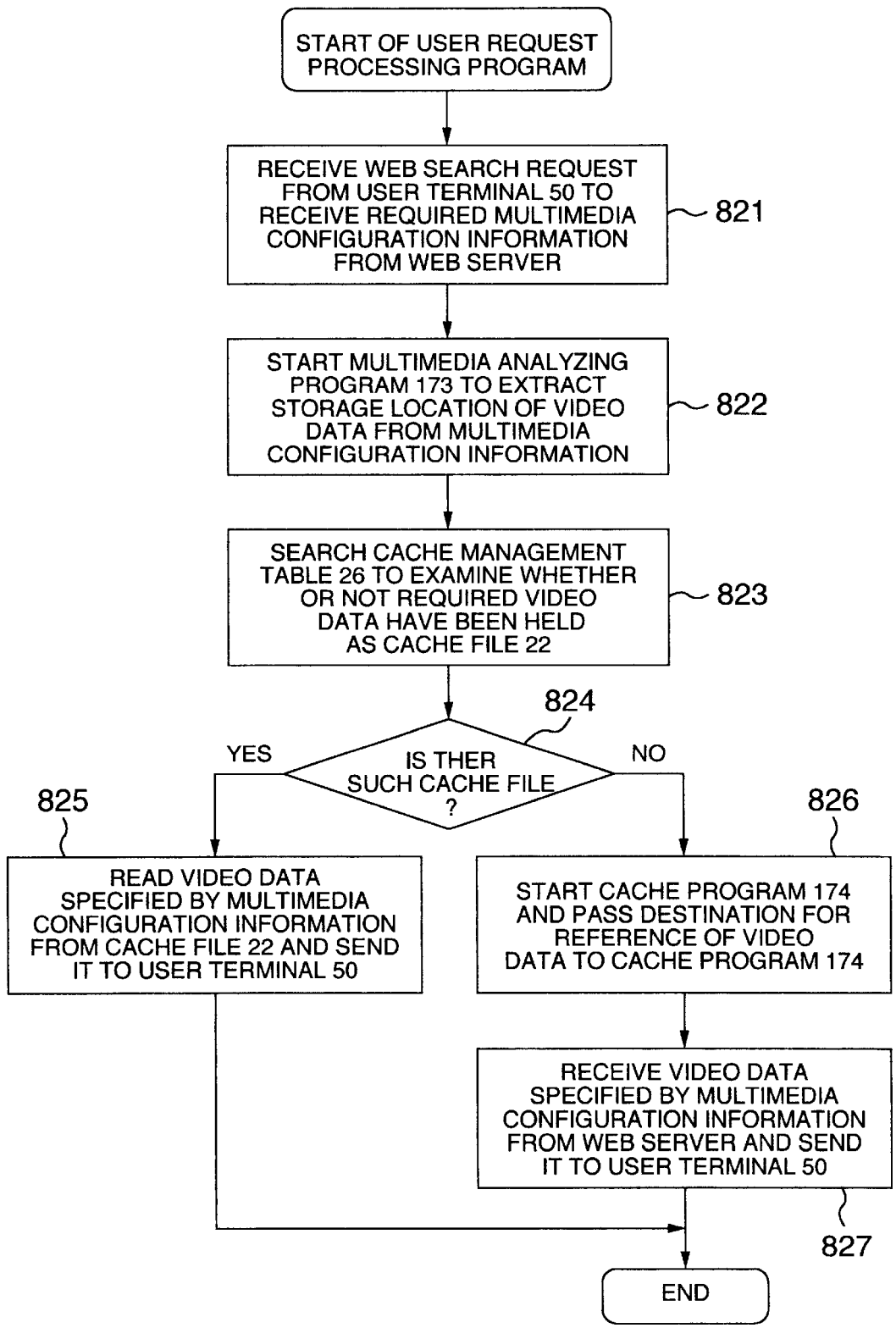
FIG. 12 is a flow chart showing the flow of a processing performed by the user request processing program when data required by a user terminal is multimedia configuration information.

FIG. 12 shows the flow of the user request processing program 170. First, the user request processing program 170 receives a WEB search request from a user terminal 50 (step 821). The user request processing program 170 requests a WEB server for multimedia configuration information required in the WEB search request and receives the multimedia configuration information from the WEB server. At this point of time, however, video data specified by the multimedia configuration information is not retrieved. Next, the user request processing program 170 starts a multimedia analyzing program 173 to extract the storage location of the video data from the multimedia configuration information (step 822). Next, a cache management table 26 is searched to examine whether or not the same video data as that specified by the multimedia configuration information has already been held as a cache file (step 823). The subsequent processing differs depending on whether or not the data has been held as a cache file (step 824). When the data has been held as a cache file, the same data as the video data specified by the multimedia configuration information is retrieved from the cache file 22 and is sent to the user terminal 50 (step 825). On the other hand, in the case where the data has not been held as a cache file, the user request processing program 170 starts a cache program 174 (step 826). At this time, the program 170 passes the multimedia configuration information to the program 174. Then, the user request processing program 170 receives the video data designated by the multimedia configuration information from a WEB server having the data held therein and sends it to the user terminal 50 (step 827).

Figure 13:
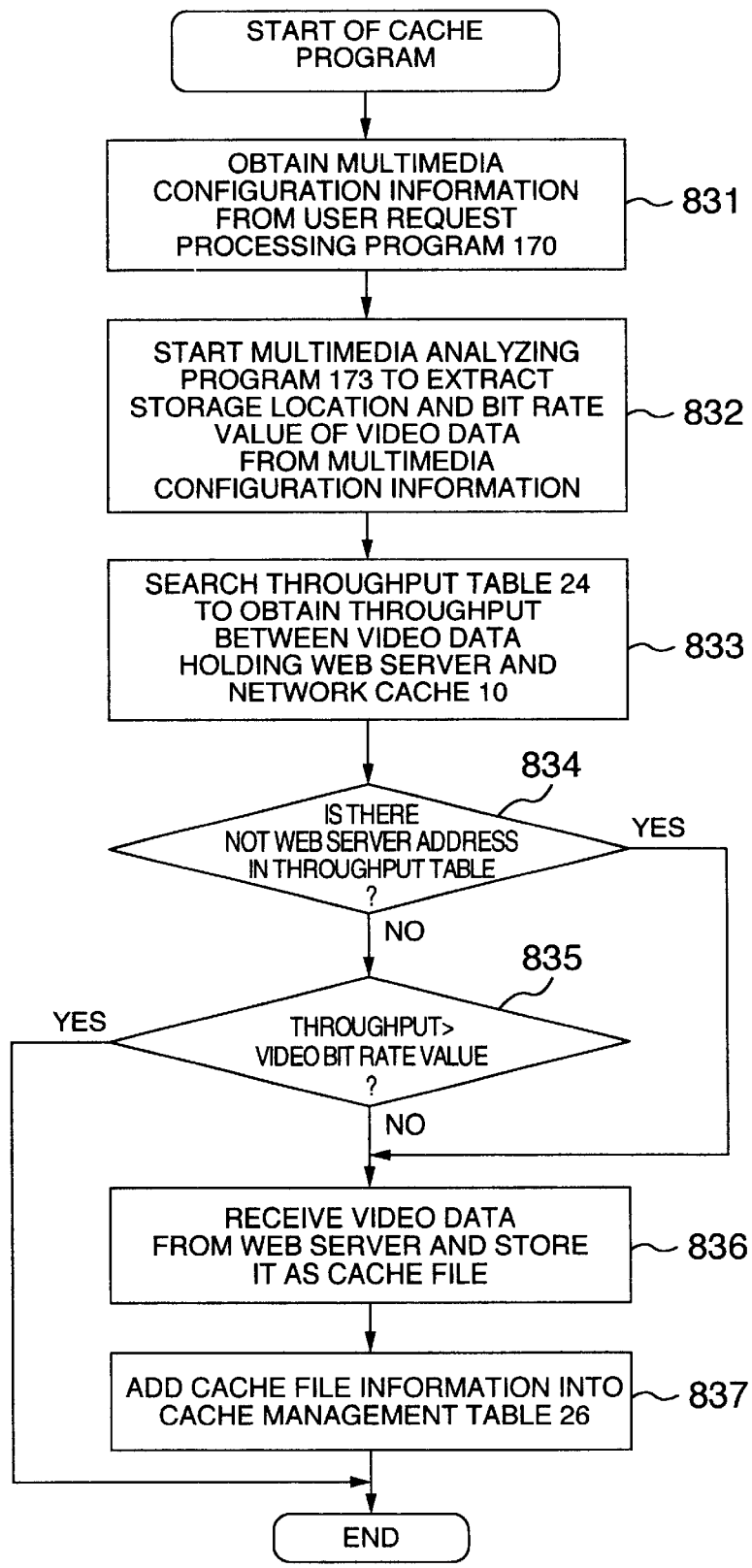
FIG. 13 is a flow chart showing the flow of a processing performed by the cache program when the data required by the user terminal is the multimedia configuration information.

FIG. 13 shows a flow chart of a processing performed by the cache program 174. The cache program 174 is activated by the user request processing program 170. At this time, the cache program 174 receives the multimedia configuration information required by the user terminal 50 from the user request processing program 170 (step 831). Next, the cache program 174 starts the multimedia analyzing program 173 to extract a storage location and a reproduction bit rate value of the video data from the multimedia configuration information (step 832). A throughput table 24 is searched to acquire a throughput value between a WEB server having the video data held therein and the network cache (step 833). When there is not the address of the corresponding WEB server in the throughput table 24 (step 834), the flow jumps to step 836 in which picture data is received from the corresponding WEB server. In the case where there is the address of the corresponding WEB server, the comparison is made between the allowable throughput value in the throughput table 24 and the video data reproduction bit rate value obtained in step 832 (step 835). When the throughput value is larger, the caching is not significant and hence the cache program is completed. In the case where the video data reproduction bit rate value is larger, the flow goes to step 836 in which a cache processing is performed. Namely, the video data is received from the WEB server and is stored as a cache file 22 (step 836). Then, the addition of the new cache file is registered into the cache management table 26 (step 837).

With the above method, when data required by the user terminal 50 is not mere video data but multimedia configuration information having complex contents, too, a cache control similar to that in the transfer of video data can be performed by making the analysis of internal data included in the multimedia configuration information to extract video data.

In a network cache of the present invention as described in the foregoing, even if a user terminal interrupts a data read or transfer request to a server, the caching of required data transferred from the server can be performed up to the last extremity of that data in its access unit by continuing the reading of required data from the server. Thereby, a satisfactory response is attainable at the time of re-request from a user terminal for the same data. Also, when a network throughput between the server and the network cache is sufficient, the caching of required data is not performed. As a result, the discard of data having been cached is not caused. Thereby, it is possible to provide a network cache in which the deterioration of the cache hit rate is prevented and a satisfactory responsibility is attainable at the time of network access by another user terminal, too.

What is claimed is:

1. A network system including a user terminal which makes a transfer request for user's required data for each file in an access unit to a server having the required data held therein and a network cache which temporarily stores data transferred from the server, said network cache comprising:

user request processing means for detecting the data transfer request from the user terminal and making the data transfer request to the server as proxy for the user terminal;

cache control means for performing a processing for storage of data transferred from the server, while partially transferring the stored data for each file in the access unit to said user terminal; and data transfer control means for continuing the storage of data transferred to said network cache from the server up to the end of that data in its access unit irrespective of the interruption of the data transfer request from the user terminal and without transferring said data to said user terminal.

2. A network cache according to claim 1, further comprising means for discriminating video data in the data transferred from the server, wherein irrespective of the interruption of a video data transfer request from the user terminal, the storage of the data transferred from the server is continued to said network cache up to the last extremity of that data in its access unit.

3. A network cache according to claim 1, wherein the data transferred from the server is multimedia configuration information indicating the combination of at least two of character data, still picture data and video data, and said network cache further comprises means for analyzing the data transferred from the server, and wherein irrespective of the interruption of a request from the user terminal for transfer of data specified by said multimedia configuration information, the storage of the specified data transferred from the server is continued up to the last extremity of that data in its access unit.

4. A network system according to claim 1 said network cache further comprising:

means for analyzing and holding a required transfer rate for data made an object of transfer;

means for detecting and holding a network throughput between the server and the network cache; and means for comparing said network throughput and said required transfer rate, the storage of the transferred data being not performed when the ratio of said network throughput to said required transfer rate is larger than a fixed value.

5. A network cache according to claim 4, further comprising means for analyzing a reproduction bit rate of video data required by the user terminal, wherein the storage of video data is not performed when the ratio of said network throughput to said video data reproduction bit rate is larger than a fixed value.

6. A network cache according to claim 4, wherein said network throughput is periodically detected and held.

7. A network cache according to claim 4, wherein said network throughput is detected and held each time a video data transfer request is made to the server.

8. A network cache according to claim 4, further comprising means for analyzing multimedia configuration information to extract a reproduction bit rate of video data specified by said multimedia configuration information, wherein the storage of said video data is not performed in the case where the ratio of a network throughput between a server having said video data held therein and the network cache to said video data reproduction bit rate is larger than a fixed value.

9. A network cache according to claim 4, further comprising means for holding an allowable throughput value for each server in which data required by a user is held, said allowable throughput value being determined from a network throughput value between the server and the network cache, wherein said required transfer rate and said allowable throughput value are compared to make the judgement of whether or not the data transferred from the server should be cached.

10. A method for controlling a network cache comprising:

requesting a data transfer request by the network cache from a user terminal as proxy for the user terminal to send the data transfer request for each file in an access unit to a server having data to be provided to the user terminal;

temporarily storing data transferred from the server by the network cache, while partially transferring the stored data for each file in the access unit to said user terminal;

recognizing an interruption of the data transfer request from the user terminal; and continuing the storage of the transferred data to said network cache from said server up to the end of that data in its access unit in response to the result of recognition of said interruption without transferring said data to said user terminal.

11. A method for controlling a network cache according to claim 10, further comprising the steps of;

analyzing a required transfer rate for data made an object of transfer;

detecting a network throughput between the server and said network cache;

comparing said network throughput and said required transfer rate; and passing the transferred data from the server to the user terminal and making the temporary storage of the transferred data free in response to the result of comparison indicating that the ratio of said network throughput to said required transfer rate is larger than a fixed value.

12. A network cache for use to be provided between a server having user's required data held therein and a user terminal making a transfer request for the required data for each file in an access unit to the server and temporarily stores data transferred from the server, comprising:

user request processing means for detecting the data transfer request from the user terminal and making the data transfer request to the server as proxy for the user terminal;

cache control means for performing a processing for storage of data transferred from the server, while partially transferring the stored data for each file in the access unit to said user terminal; and data transfer control means for continuing the storage of data transferred to said network cache from the server up to the end of that data in its access unit irrespective of the interruption of the data transfer request from the user terminal and without transferring said data to said user terminal.

13. A network cache according to claim 12, further comprising means for discriminating video data in the data transferred from the server, wherein irrespective of the interruption of a video data transfer request from the user terminal, the storage of the data transferred from the server is continued up to the last extremity of that data in its access unit.

14. A network cache according to claim 12, wherein the data transferred from the server is multimedia configuration information indicating the combination of at least two of character data, still picture data and video data, and said network cache further comprises means for analyzing the data transferred from the server, and wherein irrespective of the interruption of a request from the user terminal for transfer of data specified by said multimedia configuration information, the storage of the specified data transferred from the server is continued up to the last extremity of that data in its access unit.

15. A network cache according to claim 12, comprising:
means for analyzing and holding a required transfer rate for data made an object of transfer;
means for detecting and holding a network throughput between the server and the network cache; and
means for comparing said network throughput and said required transfer rate, the storage of the transferred data being not performed when the ratio of said network throughput to said required transfer rate is larger than a fixed value.

16. A network cache according to claim 15, further comprising means for analyzing a reproduction bit rate of video data required by the user terminal, wherein the storage of video data is not performed when the ratio of said network throughput to said video data reproduction bit rate is larger than a fixed value.

17. A network cache according to claim 15, wherein said network throughput is periodically detected and held.

18. A network cache according to claim 15, wherein said network throughput is detected and held each time a video data transfer request is made to the server.

19. A network cache according to claim 15, further comprising means for analyzing multimedia configuration information to extract a reproduction bit rate of video data specified by said multimedia configuration information, wherein the storage of said video data is not performed when the ratio of a network throughput between a server having said video data held therein and the network cache to said video data reproduction bit rate is larger than a fixed value.

20. A network cache according to claim 15, further comprising means for holding an allowable throughput value for each server in which data required by a user is held, said allowable throughput value being determined from a network throughput value between the server and the network cache, wherein said required transfer rate and said allowable throughput value are compared to determine whether or not the data transferred from the server should be cached.

21. A program, stored on a memory for implementing a network cache control method by use of a computer, said method controlling a network cache which makes a data transfer request for each file in an access unit from a user terminal as proxy for the user terminal to send the data transfer request to a server having data to be provided to the user terminal and temporarily stores data transferred from the server, the method comprising the steps of:
recognizing the interruption of the data transfer request from the user terminal; and
continuing the storage of the transferred data to said network cache from said server up to the end of that data in its access unit in response to the result of recognition of said interruption without transferring said data to said user terminal.

22. A program, stored on a memory for implementing a network cache control method by use of a computer according to claim 21, further comprising the steps of:
analyzing a required transfer rate for data made an object of transfer;
detecting a network throughput between the server and said network cache;
comparing said network throughput and said required transfer rate; and
causing the network cache to make the temporary storage of the transferred data free in response to the result of comparison indicating that the ratio of said network throughput to said required transfer rate is larger than a fixed value.

23. A computer-readable medium storing a program for implementing, by use of a computer, operation of a cache which makes a data transfer request from a user terminal as proxy for the user terminal to send the data transfer request for each file in an access unit to a server having data to be provided to the user terminal and temporarily stores data transferred from the server, said program comprising instructions performing, through execution by the computer, the steps of:
detecting an interruption of the data transfer request from the user terminal; and
causing the cache to continue the storage of the transferred data from the server therein up to the end of that data in its access unit in response to the result of detection indicating said interruption without transferring said data to said user terminal.

24. A computer-readable medium storing a program for implementing, by use of a computer according to claim 23, further comprising the steps of:
analyzing a required transfer rate for data made an object of transfer;
detecting a network throughput between the server and said network cache;
comparing said network throughput and said required transfer rate; and
causing the network cache to make the transferred data from the server caching-free in response to the result of comparison indicating that the ratio of said network throughput to said required transfer rate is larger than a fixed value.

25. The network system according to claim 1, wherein said access unit comprises a data file unit.

* * * * *